(12) United States Patent
Hara

(10) Patent No.: US 7,418,883 B2
(45) Date of Patent: Sep. 2, 2008

(54) PARKING MECHANISM FOR TRANSMISSION

(75) Inventor: Tomoyuki Hara, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 274 days.

(21) Appl. No.: 11/099,482

(22) Filed: Apr. 6, 2005

(65) Prior Publication Data

US 2005/0229732 A1 Oct. 20, 2005

(30) Foreign Application Priority Data

Apr. 15, 2004 (JP) ............................. 2004-120463
Feb. 14, 2005 (JP) ............................. 2005-036495

(51) Int. Cl.
*F16H 3/087* (2006.01)

(52) U.S. Cl. ..................... 74/325; 74/333; 74/340; 74/359

(58) Field of Classification Search ............ None
See application file for complete search history.

(56) References Cited

U.S. PATENT DOCUMENTS

| | | | |
|---|---|---|---|
| 2,883,020 A | * | 4/1959 | Kummich et al. ......... 192/18 R |
| 3,301,079 A | * | 1/1967 | Fletcher et al. ............... 74/333 |
| 5,711,409 A | | 1/1998 | Murata |
| 5,899,829 A | | 5/1999 | Salecker et al. |
| 6,463,821 B1 | * | 10/2002 | Reed et al. ..................... 74/331 |
| 6,886,673 B2 | * | 5/2005 | Burger ......................... 74/339 |
| 2002/0079190 A1 | * | 6/2002 | Burger .................... 192/219.4 |
| 2002/0084164 A1 | | 7/2002 | Burger |
| 2003/0074993 A1 | * | 4/2003 | Schupp ........................ 74/339 |

FOREIGN PATENT DOCUMENTS

| DE | 101 11 258 A1 | | 10/1995 |
|---|---|---|---|
| DE | 10 2005 015 161 | * | 11/2005 |
| EP | 1 035 358 | * | 9/2000 |
| EP | 1 288 534 A2 | | 3/2003 |
| FR | 2 718 685 A1 | | 10/1995 |
| JP | 7-139628 A | | 5/1995 |
| JP | 8-4788 A | | 1/1996 |
| JP | 2001-082554 A | | 3/2001 |
| JP | 2002-039380 A | | 2/2002 |

* cited by examiner

*Primary Examiner*—Sherry Estremsky
(74) *Attorney, Agent, or Firm*—Foley & Lardner LLP (57) ABSTRACT

An automatic transmission includes a transmission case, a parking gear fixed to the transmission case, and a meshing mechanism, such as a synchromesh mechanism. The meshing mechanism includes a coupling sleeve to engage with the parking gear and hold a transmission output member unrotatable in a park lock state when the coupling sleeve is shifted axially toward the parking gear.

15 Claims, 4 Drawing Sheets

PARKING MECHANISM FOR TRANSMISSION

BACKGROUND OF THE INVENTION

The present invention relates to a parking mechanism of a transmission for a vehicle, and specifically to a parking mechanism of an automated manual transmission.

A meshing type automatic transmission constructed to automate driver's manual operations for an ordinary manual transmission is in practical use. One example is a twin-clutch type automatic transmission including first and second input shafts to be connected with an engine through respective automatic clutches.

A U.S. Pat. No. 5,711,409 (specifically column 12, lines 32-50, FIG. 10)(corresponding to P8004788) shows a parking system for such a twin-clutch automatic transmission in which a Park function for parking lock is attained by a pressing force of an elastic member applied to a pressure plate of one of the automatic clutches, and by selecting one of the gear speed associated with that automatic clutch.

SUMMARY OF THE INVENTION

The parking system of the above-mentioned document is arranged to apply the pressing force of the elastic member in the clutch engagement direction, and to supply the oil pressure exceeding the pressing force in order to release the first clutch provided with the elastic member. Therefore, if the transmission system becomes unable to supply the oil pressure over the pressing force because of failure in the hydraulic system or the electronic control system during a vehicle running operation at one of the speeds obtained through the second automatic clutch provided with no elastic member, the first clutch is engaged by the elastic member, the elastic member presses the first clutch to engagement, and as a result, both the first and second clutches are engaged simultaneously, so that the gear mechanism might be damaged by simultaneous engagement of two different speeds.

Moreover, if the first automatic clutch is engaged suddenly by the elastic member while the vehicle is held at rest with the engine in operation, the vehicle might be started suddenly.

To avoid this, it is possible to improve the durability and reliability of the hydraulic system and electronic system or to add an additional parking mechanism. However, the measures would increase the complexity of the system, increase the size of the system or increase the cost. It is therefore an object of the present invention to provide a simple, reliable and compact parking mechanism.

According to one aspect of the present invention, an automatic transmission for a vehicle, comprises: a transmission case; at least one clutch; an input member to receive engine rotation through the clutch; an output member; a gear system including a plurality of gear sets enclosed in the transmission case, and arranged to form a drive path transmitting motion from the input member to the output member; a selecting system including a plurality of meshing mechanisms to provide one of gear speeds by altering a driving connection state of the gear system, each of the meshing mechanisms including a coupling sleeve, one of the meshing mechanisms being a first meshing mechanism; and a parking gear fixed to the transmission case, and adapted to engage with the coupling sleeve of the first meshing mechanism when the coupling sleeve is shifted axially toward the parking gear, to put the output member in a park lock state.

DETAILED DESCRIPTION OF THE INVENTION

Figure 1:
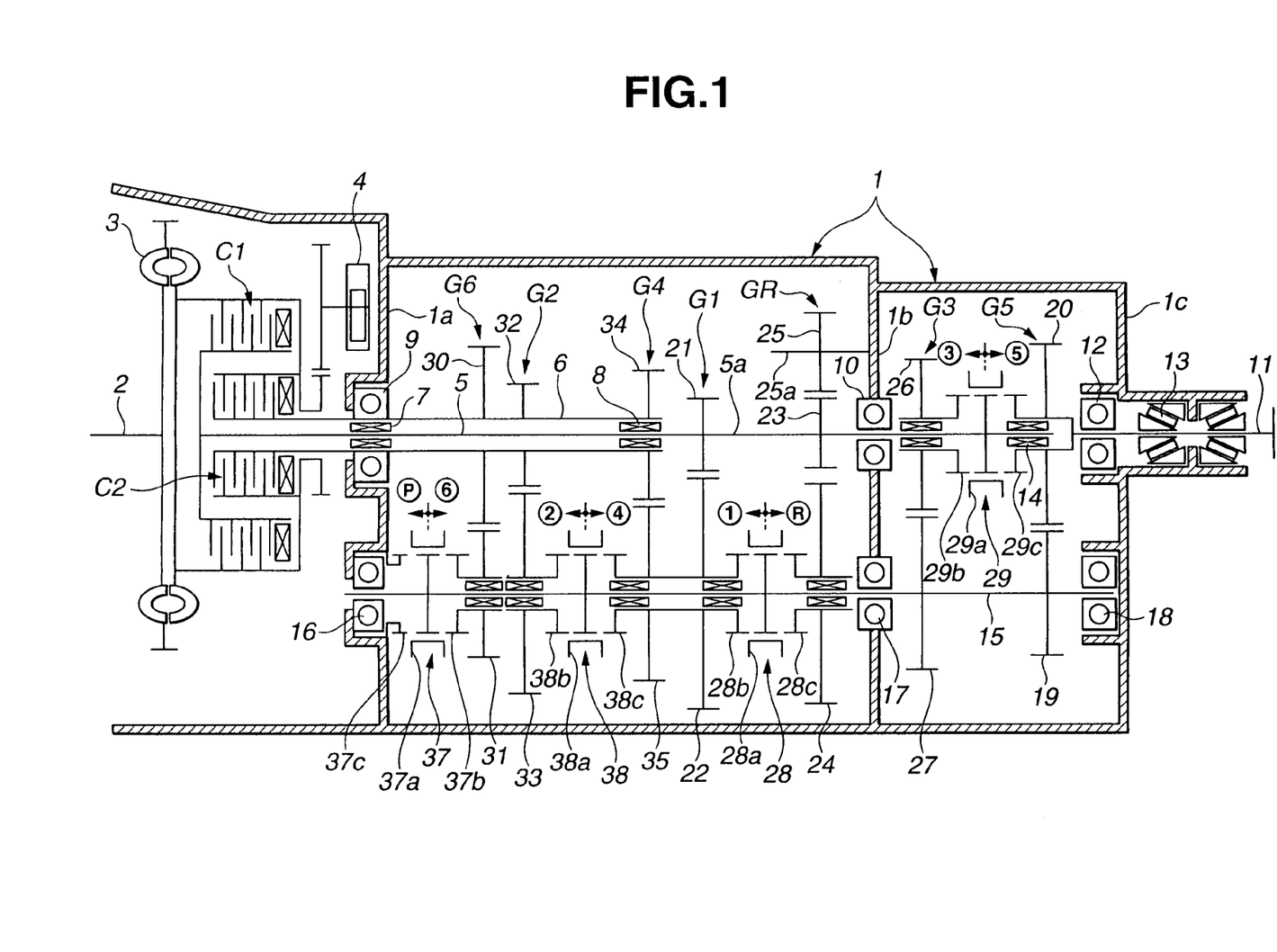
FIG. 1 is a skeleton view showing a twin-clutch meshing type automatic transmission according to a first embodiment of the present invention.
Figure 2:
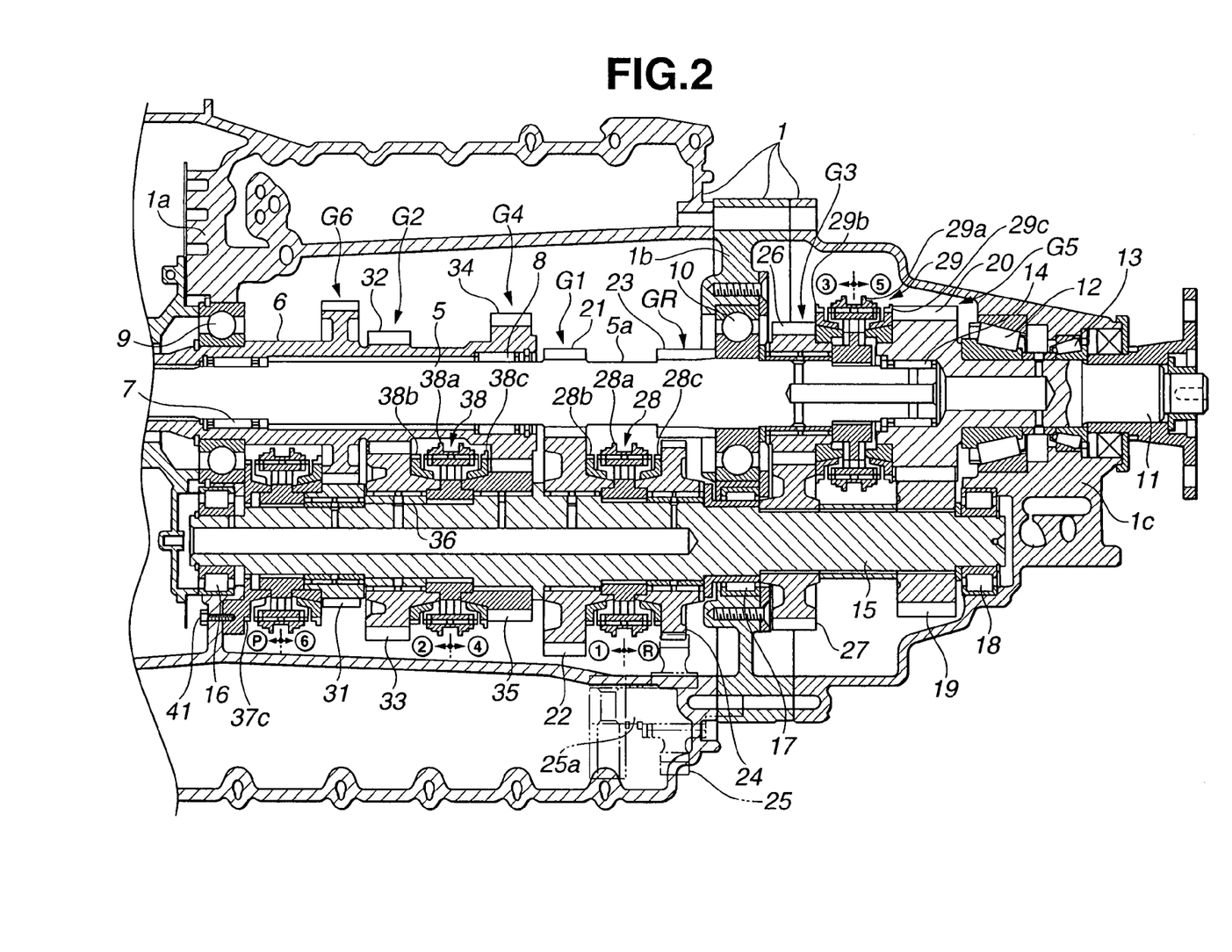
FIG. 2 is a sectional view showing the construction of the automatic transmission of FIG. 1.

FIGS. 1 and 2 show a twin-clutch, meshing type automatic transmission according to a first embodiment of the present invention. This automatic transmission is suitable for a front engine, rear wheel drive vehicle (FR vehicle).

As shown in FIG. 1, between a crankshaft 2 of an engine and a gear transmission mechanism enclosed in a transmission case 1, there are provided two automatic clutches C1 and C2. In this example, the first automatic clutch C1 is for gear speeds of odd numbers (first speed, third speed, fifth speed and reverse); and the second automatic clutch C2 is for gear speeds of even numbers (second speed, fourth speed and sixth speed). First and second clutches C1 and C2 are connected through a torsional damper 3, with the engine crankshaft 2. In transmission case 1, there is further provided an oil pump 4 which is always driven by the engine through torsional damper 3. The operating oil discharged from oil pump 4 is used for the gear speed selection control including the control of the engagement and disengagement of clutches C1 and C2.

The gear transmission mechanism in transmission case 1 includes a first input shaft 5 and a second input shaft 6 to which the engine rotation is selectively inputted from torsional damper 3 through first and second clutches C1 and C2. Second input shaft 6 is a hollow shaft, and first input shaft 5 is coaxially disposed in the hollow second input shaft 6 through a front bearing 7 and a rear bearing 8 disposed in an annular space between first and second input shafts 5 and 6, and arranged to allow both input shafts to rotate relative to each other. In this example, front and rear bearings 7 and 8 are needle bearings.

First and second input shafts 5 and 6 extend to respective front shaft ends toward the engine through a hole formed in a radially extending front (partition) wall 1a of transmission case 1. The front shaft end of first input shaft 5 is connected with first clutch C1, and the front shaft end of second input shaft 6 is connected with second clutch C2. In the example shown in FIG. 1, second clutch C2 is coaxially surrounded by first clutch C1. Front bearing 9 supports the front end of second input shaft 6 onto front wall 1a of transmission case 1. In this example, front bearing 9 is a ball bearing. The front needle bearing 7 is located near front ball bearing 9. In the example shown in FIG. 1, front needle bearing 7 is surrounded by front ball bearing 9 at the same axial position. Rear needle bearing 8 is located at the rear end of second input shaft 6 at a position axially between front ball bearing 9 and a rear bearing 10. First input shaft 5 includes a rear shaft portion projecting from the rear end of second input shaft 6, and extends rearwards through a hole of an intermediate wall 1b of transmission case 1, to the rear shaft end of first input shaft 5. Rear bearing 10 supports the rear portion of first input shaft 5 rotatably on the intermediate wall 1b of transmission case 1. In this example, rear bearing 10 is a ball bearing.

An output shaft 11 is aligned with first input shaft 5 so that the front end of output shaft 11 confronts the rear end of first input shaft 5 coaxially, and supported rotatably on a rear wall 1c of transmission case 1 by bearings 12 and 13. In this example, bearing 12 is a taper roller bearing, and bearing 13 is an axial bearing. Moreover, output shaft 11 is rotatably supported on the rear end of first input shaft 5 through a bearing 14 which is a needle bearing in this example.

A counter shaft 15 extends in parallel to a common axis of the coaxially arranged first and second input shafts 5 and 6 and output shaft 11. Counter shaft 15 is supported rotatably on front wall 1a, intermediate wall 1b and rear wall 1c of transmission case 1, respectively, by bearings 16, 17 and 18 which are roller bearings in this example. A counter gear 19 is located near the rear end of counter shaft 15. Counter gear 19 is rotatable as a unit with the counter shaft 15. An output gear 20 of output shaft 11 meshes with counter gear 19 of counter shaft 15 so that rotation is transmitted from counter gear 15 to output gear 11. Counter gear 19 and output gear 20 are disposed coplanarly on an imaginary common radial plane to which the axis of the first input shaft 5 is perpendicular.

A gear system of the gear transmission mechanism includes first and second gear set groups in this example. The first gear set group for odd number speeds (first speed, third speed, fifth speed and reverse speed) is provided between rear portion 5a of first input shaft 5 and counter shaft 15. In this example, a first speed gear set G1, a reverse gear set GR, a third speed gear set G3 and a fifth speed gear set G5 are arranged one after another in order of mention, from the front side closer to the engine toward the rear side. First speed gear set G1 and reverse gear set GR are placed axially between the rear end of second input shaft 6 and intermediate wall 1b of transmission case 1. Third and fifth speed gear sets G3 and G5 are placed axially between intermediate wall 1b and rear wall 1c of transmission case 1.

First speed gear set G1 is an interconnected pair of a first speed input gear 21 formed integrally on rear portion 5a of first input shaft 5, and a first speed output gear 22 rotatably mounted on counter shaft 15. Reverse gear set GR is a gear set or train of a reverse input gear 23 formed integrally on rear portion 5a of first input shaft 5; a reverse output gear 24 rotatably mounted on counter shaft 15; and a reverse idler gear 25 which is rotatably mounted on a shaft 25a fixedly supported by intermediate wall 1b of transmission case 1, and which is engaged with gears 23 and 24 to drivingly connect gears 23 and 24 so as to transmit rotation in a reverse rotational direction. Third speed gear set G3 is an interconnected pair of a third speed input gear 26 rotatably mounted on rear portion 5a of first input shaft 5, and a third speed output gear 27 fixedly mounted on counter shaft 15. Fifth speed gear set G5 includes a synchromesh mechanism or synchronizer 29 which can connect the rear portion 5a of first input shaft 5 directly with output shaft 11.

A first-reverse synchromesh mechanism or synchronizer 28 is provided on counter shaft 15 between first speed output gear 22 and reverse output gear 24. First-reverse synchromesh mechanism 28 includes a coupling sleeve 28a which can select the first speed by sliding leftwards as viewed in FIG. 1 from a neutral position shown in FIG. 1, and engaging with a clutch gear 28b to drivingly connect the first speed output gear 22 with counter shaft 15. To select the reverse speed, the coupling sleeve 28a is shifted rightwards from the neutral position and engaged with a clutch gear 28c to drivingly connect the reverse output gear 24 with counter shaft 15.

A third-fifth synchromesh mechanism or synchronizer 29 is provided on rear portion 5a of first input shaft 5 between third speed input gear 26 and output gear 20. Third-fifth synchromesh mechanism 29 includes a coupling sleeve 29a which can select the third speed by sliding leftwards as viewed in FIG. 1 from a neutral position shown in FIG. 1, and engaging with a clutch gear 29b to drivingly connect the third speed input gear 22 with first input shaft 5. To select the fifth speed, the coupling sleeve 29a is shifted rightwards and engaged with a clutch gear 29c to drivingly connect the first input shaft 5 directly with output gear 20 (output shaft 11).

The second gear set group for even number speeds (second speed, fourth speed and sixth speed) is provided between the hollow second input shaft 6 and the counter shaft 15. In this example, a sixth speed gear set G6, a second speed gear set G2 and a fourth speed gear set G4 are arranged one after another in order of mention, from the front side closer to the engine toward the rear side. Sixth speed gear set G6 is disposed along front wall 1a of transmission case 1, near the front end of the hollow second input shaft 6, and the fourth gear set G4 is disposed near the rear end of second input shaft 6. Second speed gear set G2 is placed axially between sixth speed gear set G6 and fourth speed gear set G4, near the middle of second input shaft 6. Six speed gear set G6 is adjacent to front (radial) wall 1a extending radially.

Sixth speed gear set G6 is an interconnected pair of a sixth speed input gear 30 formed integrally on second input shaft 6, and a sixth speed output gear 31 rotatably mounted on counter shaft 15. Second speed gear set G2 is an interconnected pair of a second speed input gear 32 formed integrally on second input shaft 6, and a second speed output gear 33 rotatably mounted on counter shaft 15. Fourth speed gear set G4 is an interconnected pair of a fourth speed input gear 34 formed integrally on second input shaft 6, and a fourth speed output gear 35 rotatably mounted on counter shaft 15.

Sixth speed gear set G6, second speed gear set G2 and fourth speed gear set G4 are arranged in order of mention as shown in FIG. 1 for the following reason.

There is a demand for placing the rear needle bearing 8 near the rear end of second input shaft 6 in connection with the bearing span. Moreover, there is a demand for forming the counter shaft 15 in a tapered shape which has a maximum diameter at or near the middle of counter shaft 15 located axially between the second gear set group (G2, G4 and G6) and the first gear set group (G1m G3, G5 and GR), and which is tapered so that the diameter or cross sectional size of counter shaft 15 is decreased gradually from the middle toward the front end. In view of these demands, the arrangement is determined by selecting the input gears 30 and 34 having an outside diameter which can provide a space for containing the rear needle bearing 8 between first and second input shafts 5 and 6; placing the gear set for the lowermost speed (fourth speed) among the speeds of the selected input gears 30 and 34 at the rearmost position remotest from the engine; placing the gear set (G6) for the highest speed among the remaining gear sets (G6 and G2) at the foremost position closest to the engine; and placing the last gear set (G2) axially between the fourth and sixth gear sets G4 and G6.

A parking gear 37c is fixed nonrotatable to the front radial wall 1a of transmission case 1. Parking gear 37c is a ring-shaped member fixed to front wall 1a by a plurality of bolts 41 distributed circumferentially around the center of parking gear 37C. Parking gear 37c is coaxial with counter shaft 15. Parking gear 37c confronts the output gear 31 of the foremost gear set G6 which is placed at the position closest to the engine, near front wall 1a of transmission case 1.

A park-sixth synchromesh mechanism (or synchronizer) 37 for sixth speed and parking lock is mounted on counter shaft 15 axially between parking gear 37c and sixth speed output gear 31. This synchromesh mechanism 37 includes a coupling sleeve 37a which can select the parking lock state to lock counter shaft 15 nonrotatable by sliding leftwards as viewed in FIG. 1 from a neutral position shown in FIG. 1, and engaging with the parking gear 37c to connect the parking gear 37c with counter shaft 15. To select the sixth speed, the coupling sleeve 37a is shifted rightwards and engaged with a clutch gear 37b to drivingly connect the sixth speed output gear 31 with counter shaft 15.

A second-fourth synchromesh mechanism or synchronizer 38 is provided on counter shaft 15 between second output gear 33 and fourth output gear 35. Second-fourth synchromesh mechanism 38 includes a coupling sleeve 38a which can select the second speed by sliding leftwards as viewed in FIG. 1 from a neutral position, and engaging with a clutch gear 38b to drivingly connect the second speed output gear 33 with counter shaft 15. To select the fourth speed, the coupling sleeve 38a is shifted rightwards and engaged with a clutch gear 38c to drivingly connect the fourth speed output gear 35 with counter shaft 15.

In the example shown in FIG. 1, a selecting system for selecting one of the gear speeds by altering the driving connection state of the gear system includes a plurality of meshing mechanisms; and the meshing mechanisms are synchromesh mechanisms 28, 29, 37 and 38.

The thus-constructed twin-clutch meshing type transmission according to the first embodiment of the present invention is operated as follows:

In the neutral (N) range, first and second clutches C1 and C2 are both engaged, but all the coupling sleeves 28a, 29a, 38a and 39a of the four synchromesh mechanisms 28, 29, 38 and 39 are put at the neutral position, so that torque is not transmitted.

To select the first speed in the D range: the transmission system disengages first clutch C1; connects first speed output gear 22 with counter shaft 15 by shifting coupling 28a of synchromesh mechanism 28 leftwards; and then engages first clutch C1. Thereby, the engine rotation from first clutch C1 is transmitted through first input shaft 5, first speed gear set G1, counter shaft 15, to output shaft 11, and the first speed is attained.

Clutch C1 and C2 are held engaged while engine rotation is transmitted at any one of all the gear speeds inclusive of the first speed. Each of clutches C1 and C2 is constructed so that the clutch is held engaged when the oil pressure is not supplied, and disengaged when the oil pressure is supplied. If, by contrast to this arrangement, the clutches are arranged to be engaged by the supply of oil pressure, the fuel consumption would be deteriorated since the oil supply is continued almost always during the drive of the vehicle. First clutch C1 is controlled in a start control mode when the first speed is used for starting the vehicle.

For upshift from first speed to second speed: the transmission system disengages second clutch C2; connects the second speed output gear 33 drivingly with counter shaft 15 by shifting coupling sleeve 38a of second-fourth synchromesh mechanism 38 leftwards; and then performs a clutch changing operation by disengaging first clutch C1 and engaging second clutch C2. After the completion of the upshift, the transmission system disengages first speed output gear 22 from counter shaft 15 by returning the coupling sleeve 28a of first-reverse synchromesh mechanism 28 to the neutral position, and engages first clutch C1. Thereby, the engine rotation from second clutch C2 is transmitted through second input shaft 6, second speed gear set G2, counter shaft 15, and output gear set (19, 20) to output shaft 11, and the second speed is attained.

For upshift from second speed to third speed: the transmission system disengages first clutch C1; connects the third speed input gear 26 drivingly with first input shaft 5 by shifting coupling sleeve 29a of third-fifth synchromesh mechanism 29 leftwards; and then performs a clutch changing operation by disengaging second clutch C2 and engaging first clutch C1. After the completion of the upshift, the transmission system disengages second speed output gear 33 from counter shaft 15 by returning the coupling sleeve 38a of second-fourth synchromesh mechanism 38 to the neutral position, and engages second clutch C2. Thereby, the engine rotation from first clutch C1 is transmitted through first input shaft 5, third speed gear set G3, counter shaft 15 and output gear set (19, 20), to output shaft 11, and the third speed is attained.

For upshift from third speed to fourth speed: the transmission system disengages second clutch C2; connects the fourth speed output gear 35 drivingly with counter shaft 15 by shifting coupling sleeve 38a of second-fourth synchromesh mechanism 38 rightwards; and then performs a clutch changing operation by disengaging first clutch C1 and engaging second clutch C2. After the completion of the upshift, the transmission system disengages third speed input gear 26 from first input shaft 5 by returning the coupling sleeve 29a of third-fifth synchromesh mechanism 29 to the neutral position, and engages first clutch C1. Thereby, the engine rotation from second clutch C2 is transmitted through second input shaft 6, fourth speed gear set G4, counter shaft 15 and output gear set (19, 20), to output shaft 11, and the fourth speed is attained.

For upshift from fourth speed to fifth speed: the transmission system disengages first clutch C1; connects the first input shaft 5 directly with output shaft 11 by shifting coupling sleeve 29a of third-fifth synchromesh mechanism 29 rightwards; and then performs a clutch changing operation by disengaging second clutch C2 and engaging first clutch C1. After the completion of the upshift, the transmission system disengages fourth speed output gear 35 from counter shaft 15 by returning the coupling sleeve 38a of second-fourth synchromesh mechanism 38 to the neutral position, and then engages second clutch C2. Thereby, the engine rotation from first clutch C1 is transmitted through first input shaft 5, and the coupling sleeve 29a to output shaft 11, and the fifth speed (speed ratio=1:1) is attained.

For upshift from fifth speed to sixth speed: the transmission system disengages second clutch C2; connects the sixth speed output gear 31 drivingly with counter shaft 15 by shifting coupling sleeve 37a of park-sixth synchromesh mechanism 37 rightwards; and then performs a clutch changing operation by disengaging first clutch C1 and engaging second clutch C2. After the completion of the upshift, the transmission system disengages the direct connection between first input shaft 5 and output shaft 11 by returning the coupling sleeve 29a of third-fifth synchromesh mechanism 29 to the neutral position, and then engages first clutch C1. Thereby, the engine rotation from second clutch C2 is transmitted through second input shaft 6, sixth speed gear set G6, counter shaft 15 and output gear set (19, 20), to output shaft 11, and the sixth speed is attained.

The transmission system can perform each of downshift operations from sixth speed to first speed successively by performing a control operation opposite to the upshift operation.

In the reverse (R) range for reverse power transmission: the transmission system disengages first clutch C1 which is engaged in the neutral (N) range; connects the reverse output gear 24 drivingly with counter shaft 15 by shifting coupling sleeve 28a of first-reverse synchromesh mechanism 28 rightwards; and then engages first clutch C1. Thereby, the engine rotation from first clutch C1 is transmitted through first input shaft 5, reverse gear set GR, counter shaft 15 and output gear set (19, 20), to output shaft 11. Reverse gear set GR reverses the rotational direction, and therefore the rotational direction of output shaft 11 is reversed. First clutch C1 is controlled in a start control mode when first clutch C1 is engaged to start the vehicle in the reverse speed.

In the P range for stoppage: the transmission system disengages second clutch C2 which is engaged in the N range; connects the parking gear 37c with counter shaft 15 by shifting coupling sleeve 37a of park-sixth synchromesh mechanism 37 leftwards; and then engages second clutch C2. In this case, the transmission system puts the coupling sleeves 28a, 29a and 38a of all the synchromesh mechanisms 28, 29 and 38 other than the park-sixth synchromesh mechanism 27 at the neutral position. Thereby, the engine rotation from first and second clutches C1 and C2 is not transmitted to counter shaft 15, and the counter shaft 15 is held in a stationary state not capable of rotating, by parking gear 37c. Park-sixth meshing mechanism 37 of this example is a synchromesh mechanism which can synchronize gear engagement with parking gear 37c and achieve smooth engagement operation, like the other shift operations.

According to the first embodiment, the meshing type automatic transmission includes transmission case 1; first and second clutches C1 and C2; first and second input shafts 5 and 6 supported rotatably in transmission case 1, and connected with an engine, respectively, through first and second clutches C1 and C2; an output shaft 11; a gear system including a plurality of gear sets (G1~G4, G6, GR) which are selectively engaged in one of different connection states for providing forward speeds and at least one reverse speed; and a selecting system including meshing mechanisms (28, 29, 37 and 38) each having a sliding clutch mechanism to bring the gear system to one of the connection states and to achieve each gear speed with one of the meshing mechanisms and the first and second clutches C1 and C2. Moreover, one of the meshing mechanism (37 in this example) is arranged to engage with the parking gear 37c to achieve the park lock state to prevent rotation of output shaft 11.

Therefore, in P range, the meshing mechanism (37) selects parking gear 37c, and serves as a member of the parking lock mechanism for preventing rotation of output shaft 11, and thereby preventing rotation of wheels of the vehicle which are connected drivingly with output shaft 11 through a differential gear. Unlike a parking lock mechanism utilizing a pressing force of an elastic member, this parking lock mechanism utilizing the meshing mechanism (37) having the sliding coupling sleeve is arranged to achieve the parking lock without connecting the engine and the first and second input shafts 5 and 6 mechanically with counter shaft 15. This parking mechanism can prevent damage of the gear system due to simultaneous engagement of first and second clutches C1 and C2, and prevent the vehicle from starting suddenly. Moreover, the parking lock mechanism can be formed merely by fixing the parking gear to the transmission case without adding or modifying a hydraulic system and an electronic control system, without complicating the system and component parts, and without incurring cost increase. This parking lock mechanism doest not require an additional mechanism for actuating the parking mechanism, and does not incur a size increase of the transmission system.

According to the first embodiment, the total number of the gear speeds provided by the twin clutch, meshing type automatic transmission is an odd number. In the illustrated example, the automatic transmission has the six forward speeds and one reverse speed, and the total number of the gear speeds is seven. When four of the total seven speeds are produced by gears driven by first input shaft 5, then the second input shaft 6 is to drive the three gear sets for the remaining three speeds. Accordingly, the meshing mechanism (37) used only for one (G6) of the odd-numbered gear sets is used for engagement with parking gear 37c. Thus, the parking mechanism is formed only by adding the parking gear to the twin clutch meshing type automatic transmission of earlier technology having odd-numbered total gear speeds. With mere addition of the fixed parking gear, the parking mechanism utilizes the slide meshing mechanism which is originally used for only one of the odd-numbered total gear speeds with only part of its ability.

In the example shown in FIG. 1, the meshing mechanism 37 (which is originally used only for sixth speed gear set G6) is disposed at a position adjacent to the front radial wall 1a of transmission case 1 to which the axis of counter shaft 15 is perpendicular; and the parking gear 37c is fixed to this front radial wall 1a so that the coupling sleeve 37a of this meshing mechanism 37 can engage with parking gear 37c by sliding in a direction away from the adjacent gear set (G6) toward the front radial wall 1a. The parking mechanism can be formed without the need for a support structure such as a bracket. Instead of front radial wall 1a, it is optional to use the intermediate or rear radial wall 1b or 1c for the parking gear support radial wall to which the parking gear is fixed. In this case, one meshing mechanism disposed between the support wall and one gear set adjacent to the support wall is used for selecting the adjacent gear set or the parking gear.

In the illustrated example of FIG. 1, the adjacent gear set paired with the parking gear is the gear set (G6) of the highest forward speed which is smaller in input load (torque) than the lower speeds. Therefore, it is possible to reduce the size of the meshing mechanism (37) and the size and power of its actuator, to the advantage of size reduction and cost reduction of the automatic transmission.

In the illustrated example of FIG. 1, the meshing mechanism (37) disposed between the parking gear and one gear set is a synchromesh mechanism or synchronizer which, in this example, is an inertia lock synchronizer. Therefore, the gear engagement with the parking gear is performed smoothly even if the coupling sleeve 37a is deviated circumferentially with respect to the parking gear when a shift operation to P range is performed. The synchromesh or synchronizing mechanism enables smooth gear engagement of the parking gear and the coupling sleeve without gear noise.

Figure 4:
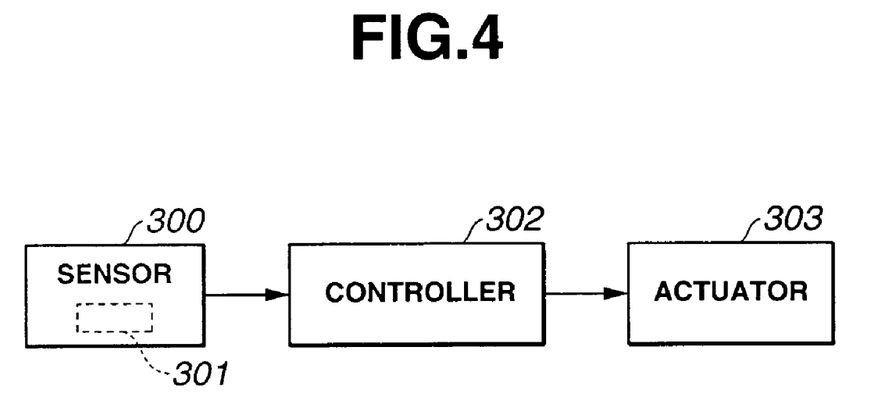
FIG. 4 is a block diagram showing a control system for the automatic transmission of FIG. 1 (or FIG. 2).

As shown in FIG. 4, it is optional to add a gear engagement sensing device 301 for sensing an engaging state of the parking gear 37c and coupling sleeve 37a, especially when the meshing mechanism used for the parking gear does not have the synchronizing function. Gear engagement sensing device 301 may be a mechanical contact type switch or may be an optical sensor. In the case of FIG. 1, the gear engagement sensing device 301 is arranged to detect whether coupling sleeve 37a is shifted completely in the leftward direction and engaged correctly with parking gear 38c. Gear engagement sensing device 301 is connected with a controller or control unit 302 for controlling the twin clutch automatic transmission to achieve the automatic shift control with an actuator 303 (which is, for example, an actuating system of actuators). When the gear engagement between parking gear 37c and coupling sleeve 37a is not complete, a signal indicating the improper gear engagement is sent from engagement sensing device 301 to control unit 302. When the improper gear engagement signal is inputted though P range is selected and a shift operation to shift coupling sleeve 37a leftwards toward parking gear 37c, then the control unit 302 shifts coupling sleeve 37a rightwards and the coupling sleeve 37 is once engaged with clutch gear 37b for selecting sixth speed gear set G6. Thereafter, control unit 302 shifts the coupling sleeve 37a rightwards toward parking gear 37c and performs an operation to achieve engagement between parking gear 37c and coupling sleeve 37a again.

Therefore, even when coupling sleeve 37a and parking gear 37c are not in correction circumferential positions relative to each other for gear engagement, the transmission system can perform a park lock operation again with coupling sleeve 37a slightly rotated to a correct posture for gear engagement, and thereby achieve the parking lock reliably and securely without undesired disengagement.

Figure 3:
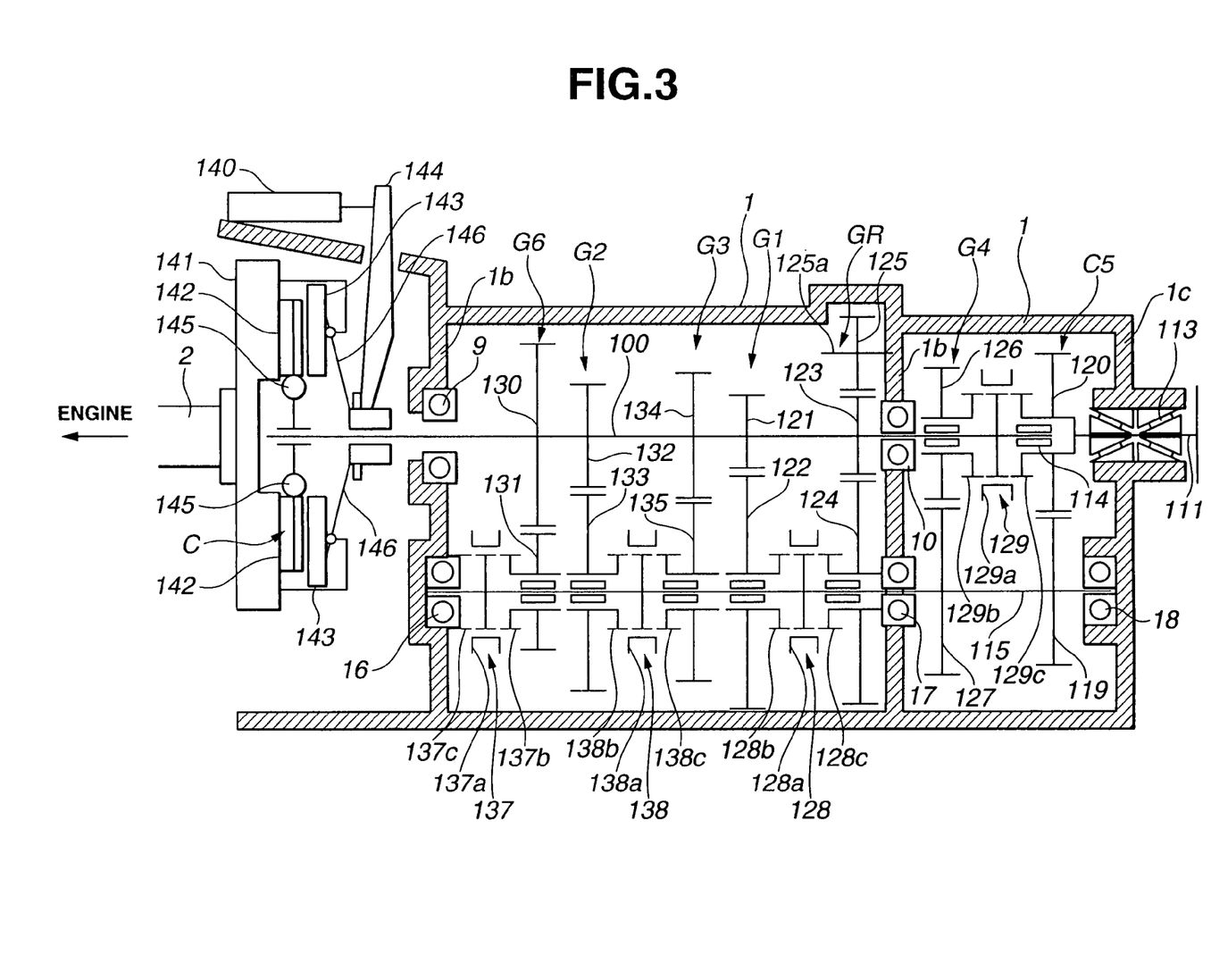
FIG. 3 is a skeleton view showing a single-clutch meshing type automatic transmission according to a second embodiment of the present invention.

FIG. 3 shows a single clutch meshing type automatic transmission according to a second embodiment of the present invention. This automatic transmission is suitable for a front engine, rear wheel drive vehicle (FR vehicle). In the second embodiment, the automatic transmission is a single clutch type having a single automatic clutch and a single input shaft to be connected with an engine through the single clutch.

As shown in FIG. 3, between a crankshaft 2 of an engine and a gear transmission mechanism enclosed in a transmission case 1, there are provided a torsional damper 145 and a single automatic clutch C. An actuator 140 controls this clutch C automatically between engagement and disengagement. Actuator 140 of this example is a hydraulic actuator. As shown in FIG. 3, clutch C includes a flywheel 141, a clutch disk 142, a pressure plate 143 and a diaphragm spring 146. When an oil pressure is supplied to actuator 140, the actuator 140 moves the pressure plate 143 rightwards toward the gear mechanism, through a linkage 144 and diaphragm spring 146. Therefore, clutch disk 142 is freed from a pressing force, and hence clutch C is disengaged. In the absence of oil supply to actuator 140, the pressure plate 143 is pushed toward flywheel 141 by the resilient force of diaphragm spring 146. Therefore, clutch disk 142 is clamped between flywheel 141 and pressure plate 143, and hence clutch C is engaged.

The gear transmission mechanism in transmission case 1 includes a single input shaft 100 to which the engine rotation is inputted from torsional damper 145 through clutch C. Input shaft 100 extends to a shaft end toward the engine, through a hole formed in a radially extending front (partition) wall 1a of transmission case 1. The front shaft end of input shaft 100 is connected with clutch C. Front ball bearing 9 supports a front end portion of input shaft 100 onto front wall 1a of transmission case 1. Input shaft 100 extends rearwards through a hole in an intermediate radial wall 1b of transmission case 1. A rear ball bearing 10 supports a rear portion of input shaft 100 rotatably on intermediate wall 1b of transmission case 1.

An output shaft 111 is aligned with input shaft 100 50 that the front end of output shaft 111 confronts the rear end of input shaft 100 coaxially, and supported rotatably on a rear radial wall 1c of transmission case 1 by an axial bearing 113. Moreover, output shaft 111 is rotatably supported on the rear end of input shaft 100 through a needle bearing 114. A counter shaft 115 extends in parallel to the aligned input and output shafts 100 and 111. Counter shaft 115 is supported rotatably on front wall 1a, intermediate wall 1b and rear wall 1c of transmission case 1, respectively, by roller bearings 16, 17 and 18. A counter gear 119 is located near the rear end of counter shaft 115. Counter gear 119 is rotatable as a unit with the counter shaft 115. An output gear 120 of output shaft 111 meshes with counter gear 119 of counter shaft 115 so that rotation is transmitted from counter shaft 115 to output shaft 111 by an output gear set of gears 119 and 120. Counter gear 119 and output gear 120 are disposed coplanarly on an imaginary common radial plane to which the axis of the input shaft 100 is perpendicular.

A gear system of the gear transmission mechanism shown in FIG. 3 includes a sixth speed gear set G6, a second speed gear set G2, a third speed gear set G3, a first speed gear set G1, a reverse gear set GR, a fourth speed gear set G4 and a fifth speed gear set G5, which are arranged in the order of mention from the left side or engine's side, to the right side as viewed in FIG. 3. Sixth speed gear set G6, second speed gear set G2, third speed gear set G3, first speed gear set G1 and reverse gear set GR are placed axially between front wall 1a and intermediate wall 1b of transmission case 1. Fourth speed gear set G4 and fifth speed gear sets G5 are placed axially between intermediate wall 1b and rear wall 1c of transmission case 1.

Sixth speed gear set G6 is an interconnected pair of a sixth speed input gear 130 formed integrally on input shaft 100, and a sixth speed output gear 131 rotatably mounted on counter shaft 115. Second speed gear set G3 is an interconnected pair of a second speed input gear 132 integrally formed on input shaft 100, and a second speed output gear 133 rotatably mounted on counter shaft 115. Third speed gear set G3 is an interconnected pair of a third speed input gear 134 integrally formed on input shaft 100, and a third speed output gear 135 rotatably mounted on counter shaft 115. Reverse gear set GR is a gear set or train of a reverse input gear 123 formed integrally on input shaft 100; a reverse output gear 124 rotatably mounted on counter shaft 115; and a reverse idler gear 125 which is rotatably mounted on a shaft 125a fixedly supported by intermediate wall 1b of transmission case 1, and which is engaged with gears 123 and 124 to drivingly connect gears 123 and 124 so as to transmit rotation in a reverse rotational direction.

Sixth speed gear set G6 is located adjacent to front wall 1a, and a parking gear 137c is fixed to front wall 1a of transmission case by a plurality of bolts arranged in a circle around the axis of parking gear 137c, as in the first embodiment. Parking gear 137c is ring-shaped, and coaxial with counter shaft 115. Front wall 1a serves as a parking gear support radial wall having a wall surface to which parking gear 137c is fixed.

A first-reverse synchromesh mechanism or synchronizer 128 is provided on counter shaft 115 between first speed output gear 122 and reverse output gear 124. First-reverse synchromesh mechanism 28 includes a coupling sleeve 128a which can select the first speed by sliding leftwards as viewed in FIG. 3 from a neutral position shown in FIG. 3, and engaging with a clutch gear 128b to drivingly connect the first speed output gear 122 with counter shaft 115. To select the reverse speed, the coupling sleeve 128a is shifted rightwards from the neutral position and engaged with a clutch gear 128c to drivingly connect the reverse output gear 124 with counter shaft 115.

A second-third synchromesh mechanism or synchronizer 138 is provided on counter shaft 115 between second output gear 133 and third output gear 135. Second-third synchromesh mechanism 138 includes a coupling sleeve 138a which can select the second speed by sliding leftwards as viewed in FIG. 3 from a neutral position, and engaging with a clutch gear 138b to drivingly connect the second speed output gear 133 with counter shaft 115. To select the third speed, the coupling sleeve 138a is shifted rightwards and engaged with a clutch gear 138c to drivingly connect the third speed output gear 135 with counter shaft 115.

A fourth-fifth synchromesh mechanism or synchronizer 129 is provided on a rear portion of input shaft 100 between fourth speed input gear 126 and output gear 120. Fourth-fifth synchromesh mechanism 129 includes a coupling sleeve 129a which can select the fourth speed by sliding leftwards as viewed in FIG. 3 from a neutral position, and engaging with a clutch gear 129b to drivingly connect the fourth speed input gear 126 with input shaft 100. To select the fifth speed, the coupling sleeve 129a is shifted rightwards and engaged with a clutch gear 129c to drivingly connect the input shaft 100 directly with output gear 120 (with output shaft 111).

A park-sixth synchromesh mechanism (or synchronizer) 137 for sixth speed and parking lock is mounted on counter shaft 115 axially between the parking gear 137c and sixth speed output gear 131. This synchromesh mechanism 137 includes a coupling sleeve 137a which can select the parking lock state to lock counter shaft 115 nonrotatable by sliding leftwards as viewed in FIG. 3 from a neutral position shown in FIG. 3, and engaging with the parking gear 137c to connect the parking gear 137c with counter shaft 115. To select the sixth speed, the coupling sleeve 137a is shifted rightwards and engaged with a clutch gear 137b to drivingly connect the sixth speed output gear 131 with counter shaft 115.

The thus-constructed single-clutch meshing type transmission according to the second embodiment of the present invention is operated as follows:

In the neutral (N) range, clutch C is engaged, but all the coupling sleeves 128a, 129a, 137a and 138a of the four synchromesh mechanisms 128, 129, 137 and 138 are put at the neutral position, so that the transmission is in the neutral state incapable of transmitting torque.

To select the first speed in D range: the transmission system disengages clutch C; connects first speed output gear 122 with counter shaft 115 by shifting coupling 128a of synchromesh mechanism 128 leftwards; and then engages clutch C. Therefore, the engine rotation from clutch C is transmitted through input shaft 100, first speed gear set G1, counter shaft 115, to output shaft 111, and the first speed is attained. Clutch C is controlled in a start control mode when the first speed is used for starting the vehicle.

For upshift from first speed to second speed: the transmission system disengages clutch C; disengages first speed output gear 122 from counter shaft 115 by returning the coupling sleeve 128a of first-reverse synchromesh mechanism 128 to the neutral position; then connects the second speed output gear 133 drivingly with counter shaft 115 by shifting coupling sleeve 138a of second-third synchromesh mechanism 138 leftwards; and then engages clutch C. Therefore, the engine rotation from clutch C is transmitted through input shaft 100, second speed gear set G2, counter shaft 115, and the output gear set 119 and 120, to output shaft 111, and the second speed is attained.

For upshift from second speed to third speed: the transmission system disengages clutch C; connects the third speed output gear 135 drivingly with counter shaft 115 by shifting coupling sleeve 138a of second-third synchromesh mechanism 138 rightwards; and engages clutch C. Therefore, the engine rotation from clutch C is transmitted through input shaft 100, third speed gear set G3, counter shaft 115 and output gear set 119 and 120, to output shaft 111, and the third speed is attained.

For upshift from third speed to fourth speed: the transmission system disengage clutch C; disengages the third speed output gear 135 from counter shaft 115 by returning the coupling sleeve 138a to the neutral position; connects the fourth speed input gear 126 drivingly with input shaft 100 by shifting coupling sleeve 129a of fourth-fifth synchromesh mechanism 129 leftwards; and then engages clutch C. Therefore, the engine rotation from clutch C is transmitted through input shaft 100, fourth speed gear set G4, counter shaft 115 and output gear set 119 and 120, to output shaft 111, and the fourth speed is attained.

For upshift from fourth speed to fifth speed: the transmission system disengage clutch C; disengages the fourth speed input gear 126 from input shaft 100 by shifting the coupling sleeve 129a to the neutral position; connects the input shaft 100 directly with output shaft 111 by shifting the coupling sleeve 129a rightwards; and then engages clutch C. Therefore, the engine rotation from clutch C is transmitted through input shaft 100 and the coupling sleeve 129a, to output shaft 111, and the fifth speed (speed ratio=1:1) is attained.

For upshift from fifth speed to sixth speed: the transmission system disengage clutch C; disengages the direct connection between input shaft 100 and output shaft 111 by returning the coupling sleeve 129a to the neutral position; connects the sixth speed output gear 131 drivingly with counter shaft 115 by shifting the coupling sleeve 137a of park-sixth synchromesh mechanism 137 rightwards; and then engages clutch C. Therefore, the engine rotation from clutch C is transmitted through input shaft 100, sixth speed gear set G6, counter shaft 115 and output gear set 119 and 120, to output shaft 111, and the sixth speed is attained. Each of downshift operations can be performed from sixth speed to first speed successively by performing a control operation opposite to the upshift operation.

In R range for reverse power transmission: the transmission system disengages clutch C which is engaged in N range; connects the reverse output gear 124 drivingly with counter shaft 115 by shifting coupling sleeve 128a of first-reverse synchromesh mechanism 128 rightwards; and then engages clutch C. Therefore, the engine rotation from clutch C is transmitted through input shaft 100, reverse gear set GR, counter shaft 115 and output gear set 119 and 120, to output shaft 111. Reverse gear set GR reverses the rotational direction, and the rotational direction of output shaft 111 is reversed. Clutch C is controlled in a start control mode when clutch C is engaged to start the vehicle in the reverse speed.

In P range for parking: the transmission system connects the parking gear 137c with counter shaft 115 by shifting coupling sleeve 137a of park-sixth synchromesh mechanism 137 leftwards. Coupling sleeves 128a, 129a and 138a of all the synchromesh mechanisms 128, 129 and 138 other than the park-sixth synchromesh mechanism 137 are held at the neutral position, so that engine rotation is not transmitted to the wheels of the vehicle. The counter shaft 115 is fixed in a stationary state not capable of rotating, by the engagement with the fixed parking gear 137c. Park-sixth meshing mechanism 137 of this example is a synchromesh mechanism which can synchronize gear engagement with parking gear 137c and achieve smooth engagement operation.

In the thus-constructed meshing type automatic transmission according to the second embodiment, a parking gear (137c) is fixed to a rearwardly facing wall surface of a parking gear support radial wall (1c) of a transmission case; and one meshing mechanism (137) is disposed between the parking gear and one gear set (G6), and arranged to engage a counter shaft (115) with the parking gear by shifting the coupling sleeve of the meshing mechanism toward the parking gear to achieve the park lock to prevent rotation of a transmission output shaft (111).

Therefore, in P range, the meshing mechanism (137) selects parking gear (137c), and serves as the parking lock mechanism for preventing rotation of the output shaft (111), and thereby preventing rotation of wheels of the vehicle which are connected drivingly with the output shaft (111) through a differential gear. Unlike a parking lock mechanism utilizing a pressing force of an elastic member, this parking lock mechanism utilizing the meshing mechanism (137) having the sliding coupling sleeve is arranged to achieve the parking lock without connecting the drive path from the engine through the input shaft (100) to the counter shaft (115). Therefore, this parking mechanism can prevent damage of the gear system due to engagement of clutch C, and prevent the vehicle from starting suddenly. Moreover, the parking lock mechanism can be constructed merely by fixing the parking gear to the transmission case without adding or modifying a hydraulic system and an electronic control system, without complicating the system and component parts, and without incurring cost increase. This parking lock mechanism doest not require an additional mechanism for actuating the parking mechanism, and does not incur a size increase of the transmission system.

The clutch employed in the illustrated embodiments is a normally-engaged type which is engaged when the oil pressure is not supplied by an actuator, and disengaged when the oil pressure is supplied. However, the present invention is not limited to the normally-engaged type clutch. It is optional to employ one or more clutches of a normally-disengaged type which is disengaged when there is no supply of hydraulic pressure, and which is engaged when a hydraulic pressure is supplied.

This application is based on a prior Japanese Patent Application No. 2004-120463 filed on Apr. 15, 2004, and a prior Japanese Patent Application No. 2005-036495 filed on Feb. 14, 2005. The entire contents of these Japanese Patent Applications Nos. 2004-120463 and 2005-036495 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission for a vehicle, comprising:
   a transmission case;
   a clutch;
   an input member to receive engine rotation through the clutch;
   an output member;
   a gear system including a plurality of gear sets enclosed in the transmission case, and arranged to form a drive path transmitting motion from the input member to the output member;
   a selecting system including a plurality of meshing mechanisms to provide one of a plurality of gear speeds by altering a driving connection state of the gear system, each of the meshing mechanisms including a coupling sleeve, one of the meshing mechanisms being a first meshing mechanism; and
   a parking gear fixed to the transmission case, and adapted to engage with the coupling sleeve of the first meshing mechanism when the coupling sleeve is shifted axially toward the parking gear, to put the output member in a park lock state,
   wherein the first meshing mechanism is disposed axially between the parking gear and a first gear set which is one of the gear sets of the gear system,
   wherein the first meshing mechanism is arranged to select the first gear set, as part of the drive path, when the coupling sleeve of the first meshing mechanism is shifted axially away from the parking gear, and
   wherein the first gear set is a gear set to select a highest forward gear speed among the gear speeds of the automatic transmission.

2. An automatic transmission for a vehicle, comprising:
   a transmission case;
   a clutch;
   an input member to receive engine rotation through the clutch;
   an output member;
   a gear system including a plurality of gear sets enclosed in the transmission case, and arranged to form a drive path transmitting motion from the input member to the output member;
   a selecting system including a plurality of meshing mechanisms to provide one of a plurality of gear speeds by altering a driving connection state of the gear system, each of the meshing mechanisms including a coupling sleeve, one of the meshing mechanisms being a first meshing mechanism; and
   a parking gear fixed to the transmission case, and adapted to engage with the coupling sleeve of the first meshing mechanism when the coupling sleeve is shifted axially toward the parking gear, to put the output member in a park lock state,
   wherein the first meshing mechanism is disposed axially between the parking gear and a first gear set which is one of the gear sets of the gear system,
   wherein the first meshing mechanism is arranged to select the first gear set, as part of the drive path, when the coupling sleeve of the first meshing mechanism is shifted axially away from the parking gear, and
   wherein the automatic transmission further comprises:
     an engagement sensing device to sense an engaging condition of the parking gear with the coupling sleeve of the first meshing mechanism; and
     a control unit to shift the coupling sleeve of the first meshing mechanism to engage with the first gear set when an incomplete engagement of the parking gear with the coupling sleeve is detected by the engagement sensing device in a parking state of the vehicle, and then to shift the coupling sleeve of the first meshing mechanism to engage with the parking gear.

3. An automatic transmission for a vehicle, the automatic transmission comprising:
   a transmission case including a radial wall;
   a clutch;
   an input shaft to receive engine rotation through the clutch;
   a counter shaft;
   an output member;
   a gear system including a plurality of gear sets enclosed in the transmission case, and arranged to transmit rotation between the input shaft and the counter shaft and to form a drive path transmitting rotation from the input shaft to the output member, one of the gear sets being a first gear set which is located adjacent to the radial wall of the transmission case and which includes an input gear fixedly mounted on the input shaft, and an output gear rotatably mounted on the counter shaft;
   a selecting system to select one of a plurality of gear speeds by altering a driving connection state of the gear system, the selecting system including a first meshing mechanism mounted on the counter shaft, the first meshing mechanism including a coupling sleeve; and
   a parking gear fixed to the radial wall of the transmission case, the first meshing mechanism being disposed between the parking gear and the output gear of the first gear set and arranged to engage the output gear of the first gear set with the counter shaft when the coupling sleeve of the first meshing mechanism is shifted in a first axial direction along the counter shaft away from the parking gear, and to engage the counter shaft with the parking gear when the coupling sleeve of the first meshing mechanism is shifted in a second axial direction along the counter shaft toward the parking gear.

4. An automatic transmission for a vehicle, the automatic transmission comprising:

a transmission case;

an input member to receive engine rotation through the clutch;

an output member;

a gear system including a plurality of gear sets enclosed in the transmission case, and arranged to form a drive path transmitting motion from the input member to the output member;

a selecting system including a plurality of meshing mechanisms to provide one of a plurality of gear speeds by altering a driving connection state of the gear system, each of the meshing mechanisms including a coupling sleeve, one of the meshing mechanisms being a first meshing mechanism; and a parking gear fixed to the transmission case, and adapted to engage with the coupling sleeve of the first meshing mechanism when the coupling sleeve is shifted axially toward the parking gear, to put the output member in a park lock state, wherein the automatic transmission further comprises a counter shaft; the input member includes an input shaft extending in parallel to the counter shaft; each of the gear sets is arranged to transmit rotation between the input shaft and the counter shaft; and the first meshing mechanism is mounted on the counter shaft.

5. An automatic transmission for a vehicle, the automatic transmission comprising:

a transmission case;

a clutch;

an input member to receive engine rotation through the clutch;

an output member;

a gear system including a plurality of gear sets enclosed in the transmission case, and arranged to form a drive path transmitting motion from the input member to the output member;

a selecting system including a plurality of meshing mechanisms to provide one of a plurality of gear speeds by altering a driving connection state of the gear system, each of the meshing mechanisms including a coupling sleeve, one of the meshing mechanisms being a first meshing mechanism; and a parking gear fixed to the transmission case, and adapted to engage with the coupling sleeve of the first meshing mechanism when the coupling sleeve is shifted axially toward the parking gear, to put the output member in a park lock state, wherein the automatic transmission further comprises a counter shaft; the input member includes an input shaft extending in parallel to the counter shaft; each of the gear sets is arranged to transmit rotation between the input shaft and the counter shaft; the transmission case includes a radial wall on which one end of the counter shaft is rotatably supported; and the parking gear is fixed to the radial wall.

6. An automatic transmission for a vehicle, the automatic transmission comprising:

a transmission case;

a clutch;

an input member to receive engine rotation through the clutch;

an output member;

a gear system including a plurality of gear sets enclosed in the transmission case, and arranged to form a drive path transmitting motion from the input member to the output member;

a selecting system including a plurality of meshing mechanisms to provide one of a plurality of gear speeds by altering a driving connection state of the gear system, each of the meshing mechanisms including a coupling sleeve, one of the meshing mechanisms being a first meshing mechanism; and a parking gear fixed to the transmission case, and adapted to engage with the coupling sleeve of the first meshing mechanism when the coupling sleeve is shifted axially toward the parking gear, to put the output member in a park lock state, wherein the transmission case includes a radial wall dividing an inside of the transmission case into a first space in which the clutch is disposed, and a second space in which all of the gear sets of the gear system are disposed; and the parking gear is located in the second space and fixed to the radial wall.

7. The automatic transmission as claimed in claim 6, wherein the first meshing mechanism is disposed axially between the parking gear and a first gear set which is one of the gear sets of the gear system.

8. The automatic transmission as claimed in claim 7, wherein the first meshing mechanism is arranged to select the first gear set, as part of the drive path, when the coupling sleeve of the first meshing mechanism is shifted axially away from the parking gear.

9. The automatic transmission as claimed in claim 8, wherein the first gear set includes a gear confronting the parking gear, and having a rotation axis which is perpendicular to the radial wall; and the parking gear confronts the gear of the first gear set coaxially across the coupling sleeve of the first meshing mechanism.

10. The automatic transmission as claimed in claim 9, wherein the radial wall is formed between the clutch and the first gear set; and the input member is an input shaft extending through the radial wall.

11. The automatic transmission as claimed in claim 8, wherein each of the meshing mechanisms inclusive of the first meshing mechanism is a synchromesh mechanism.

12. The automatic transmission as claimed in claim 8, wherein each of the meshing mechanisms other than the first meshing mechanism is placed between two of the gear sets other than the first gear set so that each of the gear sets is selected by a unique one of the meshing mechanisms.

13. The automatic transmission as claimed in claim 8, wherein the automatic transmission further comprises a counter shaft supported to rotate on a second axis parallel to a first axis on which the input member is arranged to rotate; and the parking gear is coaxial with one of the first and second axes.

14. The automatic transmission as claimed in claim 8, wherein the parking gear is coaxial with the second axis of the counter shaft.

15. The automatic transmission as claimed in claim 6, wherein the clutch includes a first clutch and a second clutch; the input member includes a first input shaft connected with the first clutch, and a second input shaft connected with the second clutch; the gear system includes a first gear system arranged to transmit motion from the first input shaft to the output member, and a second gear system arranged to transmit motion from the second input shaft to the output member; and each of the gear sets belongs to one of the first and second gear systems.

* * * * *